Aug. 22, 1933.                 C. MOHR                  1,923,162
                    SIGNAL DEVICE FOR VEHICLES
                      Filed Aug. 2, 1928            5 Sheets-Sheet 4

INVENTOR.
CARL MOHR
BY
ATTORNEY.

Patented Aug. 22, 1933

1,923,162

UNITED STATES PATENT OFFICE 1,923,162

SIGNAL DEVICE FOR VEHICLES

Carl Mohr, Los Angeles, Calif.

Application August 2, 1928. Serial No. 296,998

13 Claims. (Cl. 177—337)

This invention relates to signal devices for vehicles.

The general object of the invention is to provide an automatic signal device for automobiles and other vehicles which operate largely through actions which the operator must perform while operating the vehicle and which may also operate in conjunction with hand controlled mechanism for showing intended turns.

A specific object of my invention is to provide a signal which acts in conjunction with the steering mechanism for direction control and which operates in conjunction with the foot accelerator for indicating stop.

An additional object of my invention is to provide a signal control device in which is employed a free motion play which allows slight deviation from straight driving without causing a signal to function and which also allows for a slight turning of the steering equipment as on a crowded road without affecting the signal controls.

A further object of my invention is to provide a signal control mechanism having a free play wherein the free play may be adjusted to suit the requirements of the vehicle or the wishes of the operator thereof.

An additional object of the invention is to provide a signal device of an improved character which by slight changes in construction and without departing from the spirit of my invention will satisfy the different laws, rules and customs in different localities, states and countries.

Other objects of my invention will be apparent from the following description taken in connection with the accompanying drawings wherein.

Figures 1, 6:
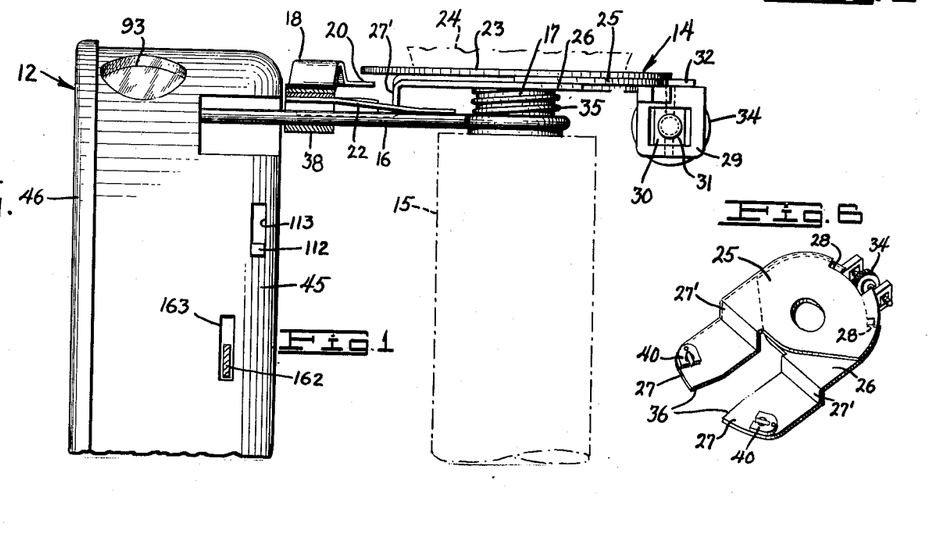
Fig. 1 is a side view of the control mechanism of my device.
Fig. 6 is a perspective view of a portion of the control mechanism.

Referring to the drawings by reference characters I have indicated my device generally at 10. As shown, the device comprises a control device indicated at 12 which is adapted to be mounted adjacent the steering wheel of a vehicle and an operating mechanism indicated at 14 which is adapted to be positioned upon the steering post 15 of the vehicle (Fig. 1). The operating mechanism 14 includes an operating arm 16 which is loosely mounted to rotate about the steering shaft 17 (Fig. 1) of the vehicle.

Figure 5:
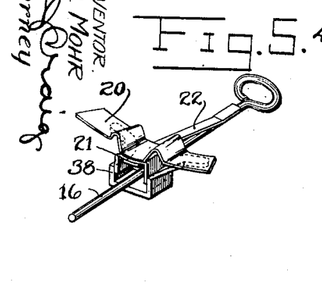
Fig. 5 is a perspective view of the control arm.

For manually moving the arm 16 I provide a segment 18 which includes a depressed finger engaging portion which I have shown adjacent the center as indicated at 19 and a tongue 20 at each end. This segment may be given different forms and may reach up through the steering wheel if desired, in which case fingers may be provided in one of the elevated parts of the segment. Adjacent the center of the segment and secured to the underside thereof I provide an inverted U-shaped member 21 to which one end of a flat spring 22 is secured. The opposite end of the spring is secured to the operating arm 16 as clearly shown in Figs. 1 and 5.

The operating mechanism 14 also includes a member 23 secured to the underside of the hub 24 of the steering wheel and a pair of disks 25 and 26 each having a finger 27 thereon. The fingers 27 which are spaced apart are depressed below the disks 25 and 26 to which they are connected by tongues 27'. The disks are connected to turn as a unit about the axis of the shaft 17.

To connect the disks 25 and 26 as a unit the disks are each provided with a cut away portion 28 on the side opposite the fingers 27 and adjacent one end of the cutaway portions each of the disks 25 and 26 is provided with a downwardly projecting lug 29. Each of the lugs 29 is provided with a pivoted member 30 having a screw threaded aperture 31 therein (see Fig. 1). The aperture 31 in the member 30 of one of the lugs 29 is provided with a left hand thread. The aperture 31 in the member 30 of the other lug is provided with a right hand thread.

The member 23 is provided with a downwardly extending inverted U-shaped member 32 firmly secured thereon and having slotted apertures adjacent its lower ends. The apertures receive the threaded shank 33 of a thumb screw 34. One end of the shank 33 is provided with left hand threads to engage the threads of the aperture 31 of the member 30 of one of the lugs 29 and the opposite end of the shank is provided with right hand threads to engage the threads in the aperture 31 of the member 30 of the other lug 29. Instead of the member 23 and the member 32 other forms can be used, depending on the form of hand wheel and hub.

As will be understood the thumb screw 34 connects the disks 25 and 26 to the member 23 so that when the member 23 is rotated by movement of the steering wheel hub 24 the disks 25 and 26 will be moved. Also, and this is an important feature, the distance between the ends of the fingers 27 on the disks 25 and 26 may be adjusted by turning the thumb screw 34 one way or the other, depending on whether the distance is to be increased or decreased. The sensitiveness of the operation of my advice and the free motion allowed is thus controlled.

Between the disk 26 and the arm 16 and surrounding the shaft 17 I provide a coiled compression spring 35 which engages the disk 26 and the arm 16 and maintains the disks 25 and 26 and the member 23 in operative position. This spring prevents joggling of the parts but at the same time allows the end of the arm 16 to be swung to a position above the plane in which it is normally moving and also serves to bring the arm back to this plane of normal movement.

Figure 2:
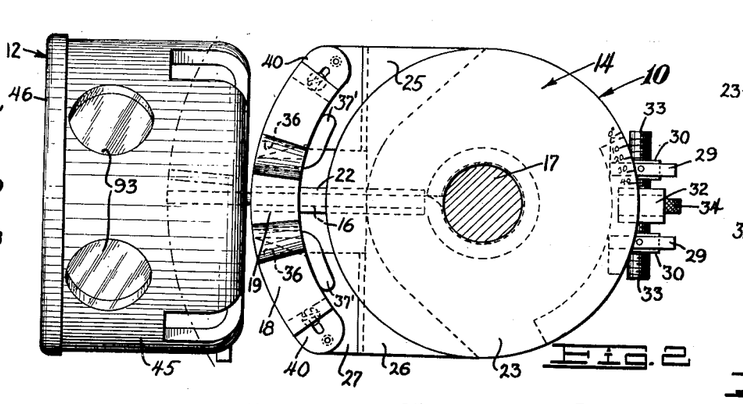
Fig. 2 is a top plan view of the device shown in Fig. 1.
Figure 3:
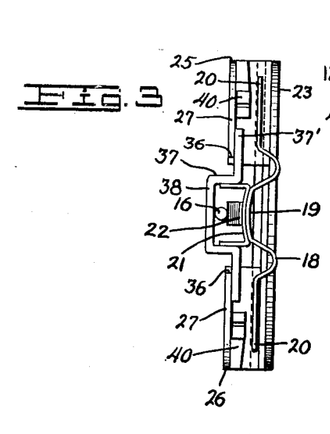
Fig. 3 is a front view of the manual control mechanism.
Figure 4:
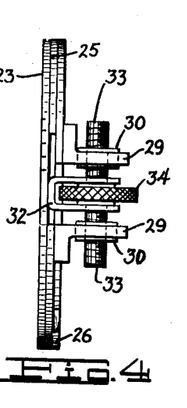
Fig. 4 is a rear view of the device shown in Fig. 2.

Each of the projections or fingers 27 includes a stop edge 36 (Figs. 2, 3 and 6). Firmly fastened to the swinging arm 16 I provide a yoke 37 which includes a central U shaped portion 38 which depends below the projections or fingers 27 and wings 37'. The wings 37' as shown in Fig. 2 slide upon the fingers 27 to maintain the yoke and arm in correct alignment.

The inverted U shaped member 21 of the operating arm 16 is positioned in the U shaped portion 38 of the yoke 37 and is capable of up and down movement therein. Adjacent the outer edge of each of the fingers 27 I provide a magnet 40 which may be of any desired type.

When the operator of the vehicle desires to actuate the signal mechanism (to be later described) to indicate in which direction he is going to turn he places one of his fingers in the depressed portion 19 of the segment 18 and moves the segment and the operating arm 16 to the side to which he intends to turn. As the operator moves the segment 18 he presses down on it against the action of the spring 22 thereby causing the tongues 20 of the segment which are attracted by the magnet to engage the magnets 40 so that when the operator removes his hand the magnets 40 retain the segment and the operating arm in the position to which they have been moved.

The segment and the operating arm will remain in their relative positions to which they have been moved until the segment is manually returned to its natural position, or until after the vehicle has made the intended turn and the steering wheel is again straightened out, as will be later described. If the operator should make a sharp turn to the opposite side of his signal the signal will immediately disappear and a signal for the new turn will be established at the commencement of such turn, as will be presently understood.

After the segment has been moved to cause the arm 16 to move to indicate the driver's intention the device remains inactive until a turn is made. The steering wheel being then turned the disks 25 and 26 will rotate and one of the stop edges 36 engage the adjacent edge of the U-shaped portion 38 of the yoke 37 and will cause the arm 16 and the segment 18 to rotate with them as a unit through as large an arc as the steering wheel is turned.

When the steering wheel is straightened out the other stop edge 36 on the adjacent disk finger 27 engages the adjacent side of the U shaped portion 38 of the yoke 37 and returns the segment with the swinging arm into engagement with control device 12, which will return the swinging arm to its central or natural position as will be more fully described hereinafter.

If the operator of the vehicle does not manually actuate the segment 18 to indicate his intention to make a turn, the segment and operating arm 16 will be automatically moved to actuate the signal when the steering wheel is turned.

If the steering wheel is turned, for instance to the left, the stop edge 36 of the projection or finger 27 on the disk 25 will engage one side of the U-shaped portion 38 of the yoke 37 and move the yoke which in turn will move the segment and the operating arm 16 which will actuate the signal to indicate in which direction the vehicle is turning. Only a very slight movement of the arm 16 is necessary to actuate the signal so the direction of turn is indicated practically before the vehicle commences to turn.

When the segment 18 and the operating arm 16 have been automatically moved by the turning of the steering wheel the tongues 20 of the segment are not moved into engagement with the magnets 40, therefore as soon as the engaging stop edge 36 during straightening has returned the swinging arm well within the control device (to be later described) and moves away from the side of the U-shaped portion 38 of the yoke 37 the segment and the operating arm 16 will be returned to their natural positions by means of the control device 12 as will now be more fully described.

Figure 7:
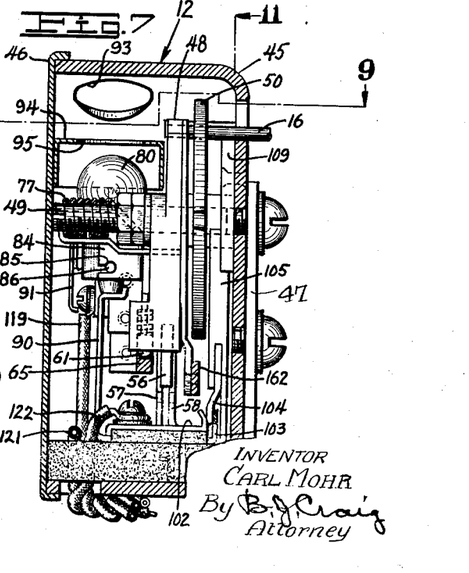
Fig. 7 is a longitudinal section through the control device.

The control device 12 includes a housing 45, a cover 46 and any suitable type of bracket as indicated at 47 in Fig. 7, by which it is secured to the vehicle adjacent to the steering wheel. Within the housing 45 I provide a control arm 48, loosely mounted for swinging movement on a shaft 49, and a disk 50 also loosely mounted on the shaft 49.

The arm 48 which is made of an insulated material comprises an upper and a lower pending portion. The arm is provided in its upper portion with a notch 52 in which the arm 16 is normally positioned. Likewise the disk 50 is provided with an elongated notch 53 in which the arm 16 is normally positioned and with a plurality of notches 54 in which the arm 16 intermittently engages.

Figure 8:
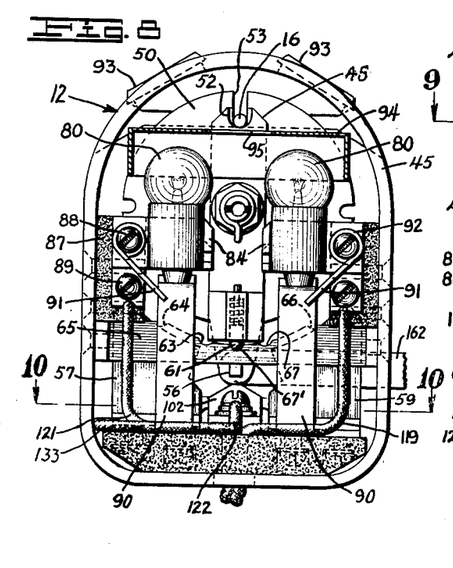
Fig. 8 is a rear view of the device shown in Fig. 7 with the cover removed.
Figure 9:
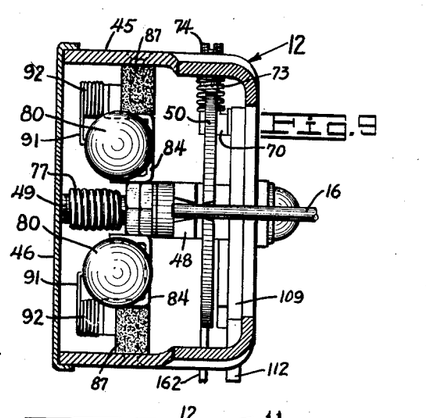
Fig. 9 is a section taken on line 9—9 of Fig. 7.
Figure 10:
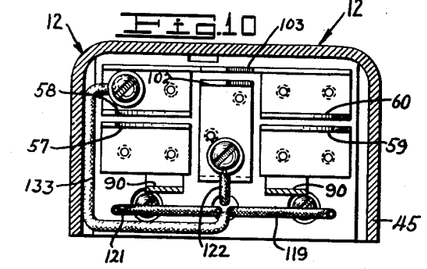
Fig. 10 is a section taken on line 10—10 of Fig. 8.

The operating arm 16 is adapted to swing the control arm 48 to one side or the other and to simultaneously rotate the disk 50 in one direction or the other. The arm 48 is provided adjacent its lower end with an electrical contact bar 56 which is, when moved to one side (see Fig. 8), adapted to bridge a pair of spaced electric contacts 57 and 58, and when moved to the opposite side to bridge a similar pair of contacts 59 and 60. Also adjacent the lower end of the control arm 48 I provide a spring pressed latch 61 which is adapted when moved to one side to engage a notch 63 or a notch 64 in a bar 65 and when moved to the opposite side to engage a notch 66 or a notch 67 in a bar 65. In the central position as shown the latch is engaging a notch 67'.

Figure 14:
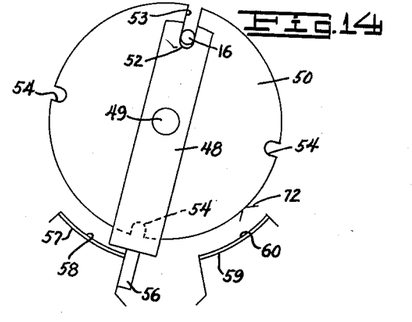
Figure 23:
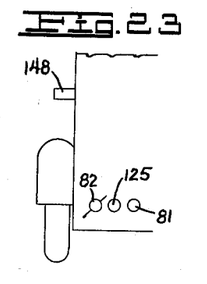
Figure 24:
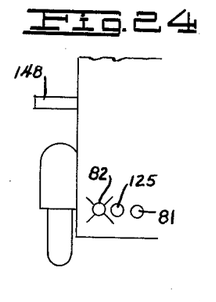

When the operating arm 16 is first moved by the operator to indicate a left turn as previously described, the operating arm 16 moves the control arm 48 and the disk 50 to the position shown in Fig. 14, wherein the contact bar 56 of the arm bridges the contacts 57 and 58 and causes a left turn signal to be indicated as diagrammatically shown in Figs. 23 and 24. When the arm 48 is in this position the latch 61 engages the notch 63 in the bar 65 and resiliently retains the control arm in position against accidental movement.

Figure 15:
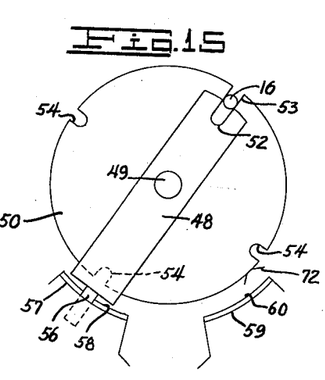

As the steering wheel is turned to make the turn the mechanism 14 moves with it as a whole as previously stated, and the arm 16 moves the control arm 48 and the disk 50 to the position shown in Fig. 15. In this position the latch 61 engages the notch 64 and resiliently retains the arm in position. The contact bar 56 still bridges the contacts 57 and 58. As the arm 16 moves in a plane parallel to the axis 49 and the control arm 48 swings on an arc the arm 16 leaves the slot 52 of the control arm when it has reached this position, whereupon further movement of the arm 16 will not move the control arm. Upon further turning of the steering arm. wheel the arm 16 will leave the elongated slot 53 in the disk 50 as shown in Fig. 16.

Figure 17:
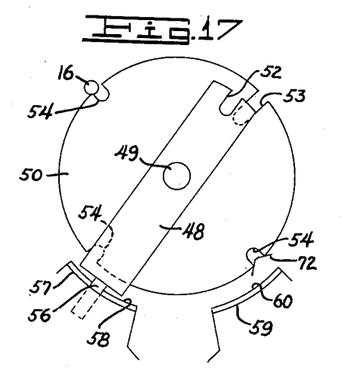
Figure 18:
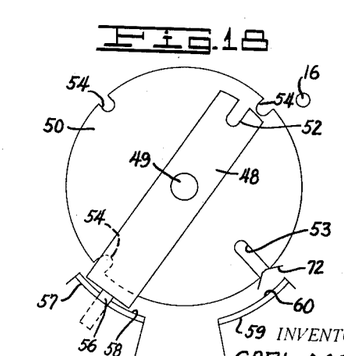
Figure 19:
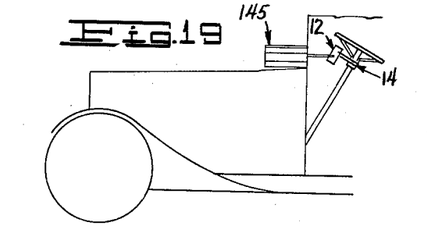
Fig. 19 is a diagrammatic fragmentary side view of a vehicle equipped with my signaling device.

Should the steering wheel be turned a complete revolution the arm 16 will approach the opposite side of the disk 50 and engage one of the shallow notches 54 as shown in Fig. 17, and rotate the disk 50 until it leaves the notch 54 as shown in Fig. 18. The notches 54 being of less depth than the notch 53 the arm 16 will move upward beyond its normal position due to the spring 35 and will not disturb the control arm as it passes thereover.

For preventing accidental movement of the disk 50 during a turning operation I provide an arm 70 pivoted to the casing as at 71 and provided adjacent its lower end with a stop boss 72 which is adapted to engage the slots 53 and 54. The arm 70 is shown as adapted to be normally urged towards the disk 50 by a cooled spring 73, the tension of which may be adjusted by a stud 74 which engages the spring and is positioned in the housing 45. The stud also has a shoulder 75 which engages the spring.

Figure 16:
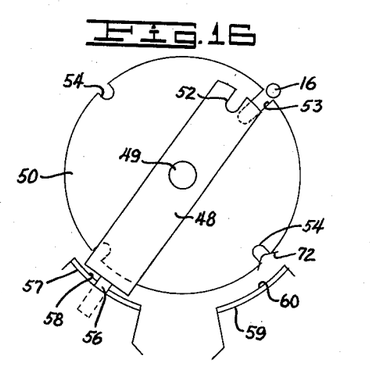

As the disk 50 is turned by the arm 16 or the stop boss 72 enters one of the notches 54 as shown in Figs. 16 and 17 or the notch 53 as shown in Fig. 18, and prevents accidental movement of the disk thereby retaining the notches in position so that the arm 16 will readily enter another of the notches as it moves around or the notch it has just left when it moves back again when the steering wheel is being straightened after the turn is completed. When the turn is completed and the steering wheel is turning back to a straight position the arm 16 engages the same number of notches 54 as it did in making the turn and revolves the disk 50 in a reverse direction until it enters the notch 53, whereupon when it approaches the control arm 48 it will enter the slot 52 of this arm and upon further movement will move the control arm towards its central or natural position, thereby moving the contact bar 56 out of engagement with the contacts 57 and 58.

Figure 21:
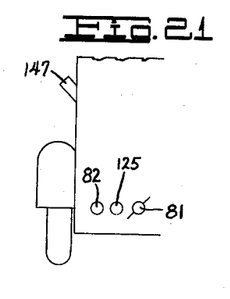
Figs. 21 to 26 inclusive are diagrammatic rear views of a vehicle showing the mechanical and light signals in various signaling positions.
Figure 22:
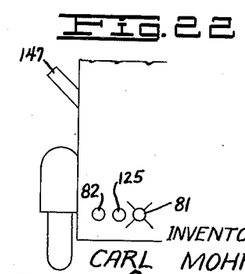

When the operating arm 16 is moved to make a right signal and the steering wheel is turned to make a right hand turn the operation of the device is the same as previously described in connection with a left hand turn, except that the control arm 48 and the disk 50 move in the opposite direction and the contact bar 56 engages the contacts 59 and 60 to show a right hand turn signal, as shown in Figs. 21 and 22.

To help centralize the control arm 48 I provide a coiled spring 77 which surrounds the shaft 49 and has one end anchored in the shaft 49 and the other end secured to the control arm 48 as shown in Fig. 7. The tension of the spring 77 is not great enough to disengage the latch 61 from the comparatively deep notches 64 and 66 in the bar 65 so it will not move the control arm when the latter has been moved into them. From any position between the notches 64 and 66 the spring 77 has power to bring the control arm to its central position. The notches 63 and 67 are so shallow that the spring 77 readily frees the latch 61 therefrom. Only when one of the magnets 40 is retaining the control arm can the spring 77 fail to move the control arm from its position.

Figure 27:
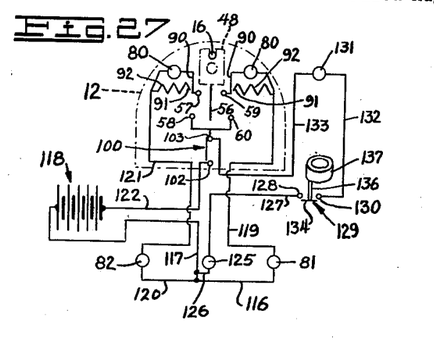
Fig. 27 is a wiring diagram of my signal device.

In the housing 45 I provide a pair of pilot lamps 80 wired in series with the right and left signal lamps 81 and 82 as shown in Fig. 27. The pilot lamps 80 are shown as positioned in U shaped electrical conductive sockets 84 having bayonet slots 85 therein for the reception of the retaining pins 86 on the lamps 80. Each of the sockets 84 are secured to an insulated block 87 by a screw 88 and is provided with a terminal 89 to which a wire from the corresponding signal lamp is adapted to be connected. The center terminal of the lamps 80 are each adapted to engage a center contact member 90. One of the contact members 90 is formed integral with the contact 59 as shown in Fig. 10 and the other member is formed integral with the contact 57.

The members 90 are resilient and normally exert a pressure towards the rear of the housing so that should a defective pilot lamp 80 be removed the associated member 90 will engage an extended finger 91 of a resistance unit 92 mounted on the fastening screw 88 of the socket 84. The resistance units 92 are of the same ohmic capacity as the pilot lamps 80 so when a pilot lamp is removed the voltage on the corresponding signal lamp will not be increased.

The housing 45 is provided with a viewing port 93 for each of the pilot lamps 80. A shield 94 having an aperture 95 therein is positioned over the pilot lamps. The aperture is so arranged that the pilot lamp for the right turn will throw its light only through the right port as seen from the driver's seat, while the pilot light for the left turn will throw its light through the left port. This arrangement is necessary because the pilot lights in the control device are placed in positions opposite to the sides for which they signal.

Figure 11:
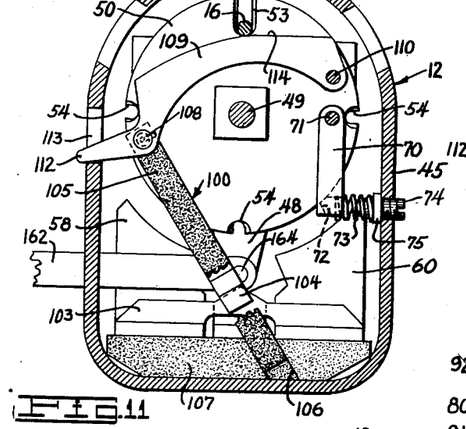
Fig. 11 is a section taken on line 11—11 of Fig. 7.
Figure 12:
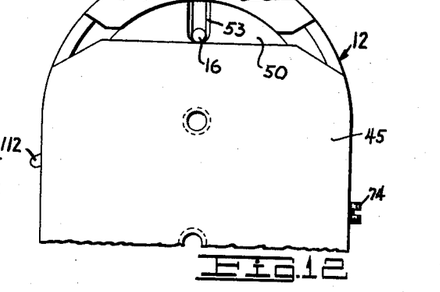
Fig. 12 is a fragmentary front view of the control device.
Figure 13:
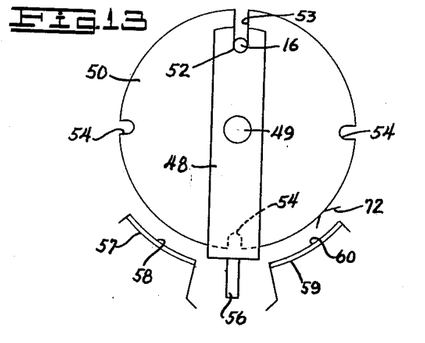
Figs. 13 to 18 inclusive are diagrammatic views showing various relative positions of the switch arm, control disk and actuating arm.

For allowing the vehicle wheels to be turned without lighting the signal lamps such as when crimping the front wheels when parked on a hill, I may provide a cut-out switch indicated at 100 (best shown in Fig. 11). This switch includes contacts 102 and 103 which are adapted to be bridged by a contact bar 104 supported by an insulated bar 105 and adapted to actuate in a groove 106 in an insulated block 107. The contact 102 supplies the current from the source of power and the contact 103 is integral with the contacts 58 and 60.

The insulated bar 105 is slackly connected as at 108 to an arm 109 which is pivoted adjacent one end to the housing as at 110 and is provided adjacent the opposite end with a handle 112 which extends through an aperture 113 in the housing. The upper surface 114 of the arm 109 is arced and is positioned just below the arm 16.

When it is desired to cut-out the signal mechanism the operator moves the arm 109 up thereby disengaging the contact bar 104 from the contacts 102 and 103. The operating arm is usually in this case somewhere near the outside of the control device and will therefore not hinder the opening of the switch. If the operating arm is near its central position it will hinder the opening of the switch. In such cases the steering wheel is so near the straight forward position that a slight turn of the wheel will bring the operating arm into its central position in which the contact 56 cuts out the connection.

To reset the signal mechanism the operator moves the arm 109 downward to the position shown in Fig. 11. Should the operator neglect to reset the device, the operating arm 16 will, when the steering wheel is straightened, engage the upper surface 114 of the arm 109 and force it downward thereby automatically resetting the device.

As diagrammatically shown in Fig. 27 the right signal lamp 81 is connected by a wire 116 to a wire 117 which is connected to one side of a battery 118 or any other suitable source of electrical power. Another wire 119 leads from the lamp 81 to the socket of its corresponding pilot lamp 80 and the center contact member 90 which as previously stated is integral with the contact 59. The left signal lamp 82 is connected by a wire 120 to the wire 117 from the battery and is connected by another wire 121 to the socket of its corresponding pilot light 80. As previously stated the center contact member 90 of the pilot lamp is integral with the contact 57. A wire 122 connects the other side of the battery with the contact 102 of the cut-out switch 100.

For signaling a stop I provide a stop light 125 which is shown in Fig. 27 as connected by a wire 126 to the wire 117 from the battery. Another wire 127 connects the stop light to one contact 128 of a stop switch 129 which includes a second contact 130 connected to a pilot lamp 131 by a wire 132. The pilot lamp 131 is connected by a wire 133 to the contact 103 of the cut-out switch 100 and for closing the circuit in the stop light circuit a contact bar 134 is provided which is adapted to bridge the contacts 128 and 130 of the switch 129.

Figure 20:
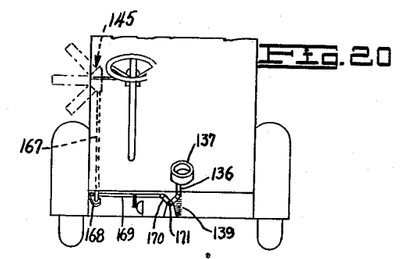
Fig. 20 is a rear diagramamtic view of a vehicle equipped with my signalling device.
Figure 28:
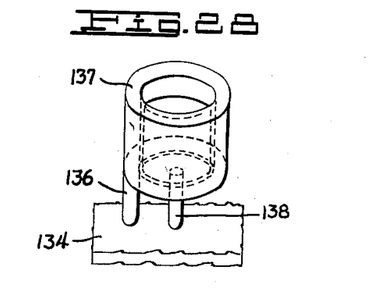
Fig. 28 is a perspective view of the foot accelerator stop attachment.

The contact bar 134 is mounted on a member 136 which is secured to a sleeve 137 which is adapted to surround the accelerator foot pedal 138 as shown in Fig. 28. The sleeve 137 is adapted to be resiliently urged to a raised position by a spring 139 as indicated in Fig. 20. In Fig. 27 the member 137 is for clarity shown like a sleeve. Usually however, I prefer the cup form which will prevent dirt from accumulating between the member 137 and the accelerator.

Figure 25:
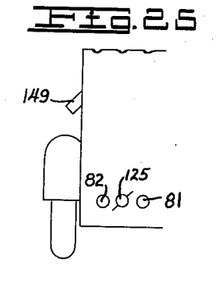
Figure 26:
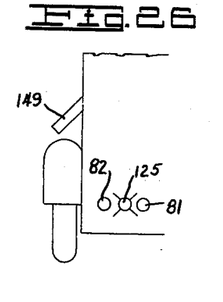

As long as the operator of the vehicle retains his foot on the accelerator pedal the contact bar is retained out of engagement with the contacts 128 and 130 but when the operator removes his foot from the accelerator pedal to put it on the brake pedal the spring 139 forces the member 136 upward thereby causing the contact bar 134 to bridge the contacts 128 and 130 and close the circuit in the stop light circuit, thereby giving a stop signal as indicated in Figs. 25 and 26.

I provide a mechanical signaling device indicated at 145, which is adapted to act in conjunction with the electrical signals (see Figs. 29 to 35 inclusive). As shown, this device comprises a support 146 having right, left and stop semaphore arms 147, 148 and 149 pivoted thereto as at 150, 151 and 152.

Springs 153 are adapted to urge the semaphore arms to a closed position and magnets 154 adjacent the ends opposite the hinges are adapted to normally retain the semaphore arms in a closed position and prevent flapping of the arms.

For operating the semaphores 147 and 148 I provide a member 155 secured to a shaft 156 mounted on the support 146. The member 155 includes a cam surface 157 which is adapted to engage the semaphore 147 and a cam surface 158 which is adapted to engage the semaphore 148. The shaft 156 has an arm 159 secured thereto which is pivoted as at 160 to a link 162 which extends through an aperture 163 in the housing 45 and is pivoted as at 164 to the control arm 48.

When the operating arm 16 swings the arm 48 and the latter arm moves to one side as previously described the link 162 will rock the shaft 156 and the member 155 thereby causing the cam surface 158 to engage and move the semaphore 148 outwardly. When the control arm 48 is moved to the opposite side it will rock the shaft 156 in the reverse direction and cause the cam surface 157 of the member 155 to engage and move the semaphore 147 outward.

The cam surfaces 157 and 158 are so shaped as indicated at 165, that when the arm 48 moves only to one of the first notches the semaphore will be only partly extended as shown in Fig. 21, but when the arm reaches the limit of its movement the semaphore will be fully extended as shown in Fig. 22.

Thus when the operator moves the segment 18 to signal his intention to turn to the right or the left, the right or left semaphore is only partly visible as shown in Figs. 21 and 23, but, as the steering wheel is moved to commence the turn, the semaphore is moved to a fully extended position as shown in Figs. 22 and 24.

For localities where the intention signals must be like the operating signals the cams can be given such form as to swing the semaphores completely out when the control arm is in the intention position.

The stop indicating semaphore 149 is adapted to be actuated by a member 166 secured to a shaft 167 mounted in the support 146. The shaft 167 has an arm 168 thereon which is slackly connected to a link 169 pivotally connected to one arm of a bell crank 170 (see Fig. 20).

The bell crank 170 is pivotally connected to the frame of the vehicle as indicated at 171 and the other arm of the bell crank is slackly connected to the switch operating member 136 of the sleeve 137.

In Fig. 20 the stop signal switch 129 is shown as actuated from a link 169, which gives the same result as the arrangement shown in diagram in Fig. 27.

Thus when the operator removes his foot from the accelerator pedal and the sleeve 137 is forced upward by the spring 139 the member 136 rocks the bellcrank 170 which, through the medium of the link 169 and the arm 168, rotates the shaft 167 and the semaphore actuating member 166, thus causing the stop semaphore 149 to move outward.

The member 166 (Fig. 30) includes a cam surface 173 which is similar to the cam surfaces 165 on the member 155 so that when the sleeve member 137 moves only part of the way up the stop semaphore is only partly extended as shown in Fig. 25, but when the member 136 reaches the limit of its movement the stop semaphore is fully extended as shown in Fig. 26. As described for signals for turns I can also, where required, let the semaphore 149 move quickly to full signal position without an intermediary signal.

Non-magnetic screws 175 are provided adjacent the ends of the magnets 154 so that the pulling power exerted on the semaphores by the magnets may be adjusted by moving the semaphores away from or towards the magnets.

Figures 29, 35:
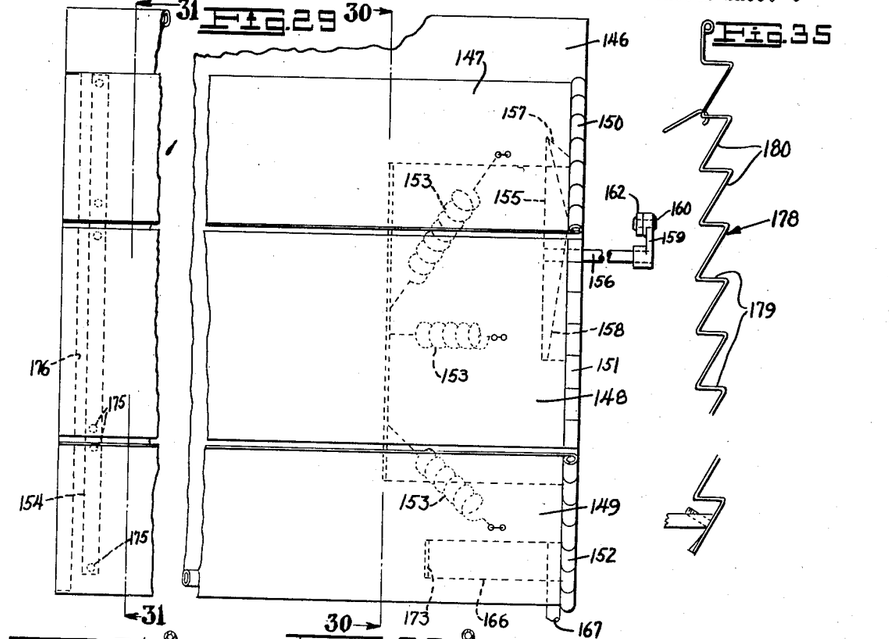
Fig. 29 is a side view of the mechanical signal which operates in conjunction with the light signals.
Fig. 35 is a top view of a modified form of signal arm.
Figures 30, 32, 33, 34:
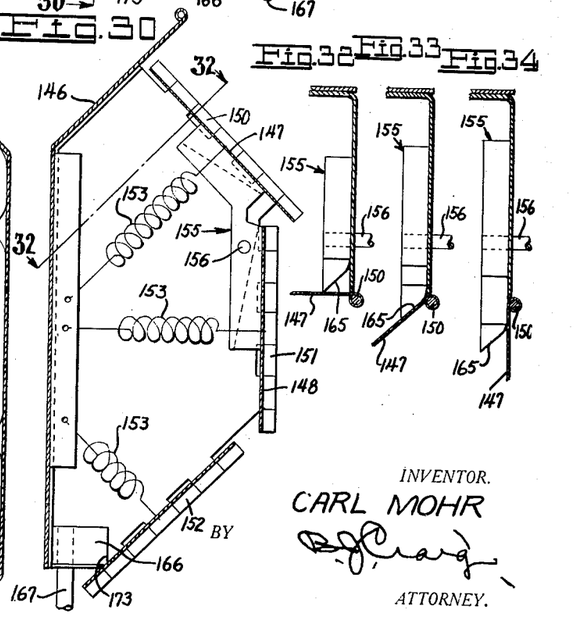
Fig. 30 is a section taken on line 30—30 of Fig. 29.
Fig. 32 is a section taken on line 32—32 of Fig. 30 showing the operating cam of the mechanical signal in a normal position.
Fig. 33 is a view similar to Fig. 32 showing the cam as operating a signal arm to a partly extended position.
Fig. 34 is also a view similar to Fig. 32 showing the cam as operating the signal arm to a fully extended position.
Figure 31:
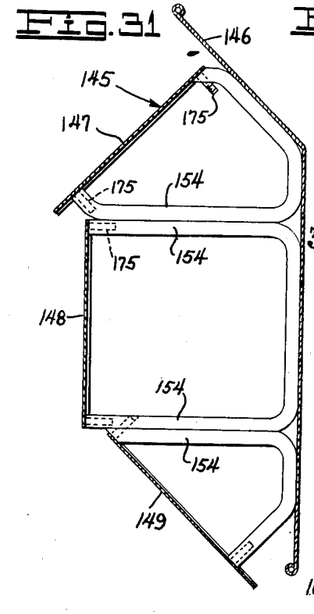
Fig. 31 is a section taken on line 31—31 of Fig. 29.

As shown in Figs. 29 and 31 the free ends of the semaphores extend beyond the magnets 154 and have attached on the inside of the edges, wedges 176 of non-magnetic material which when a semaphore is forced outward, will be drawn with the flexible blades of the semaphores and come between the magnets and blades, thus reducing the magnetic power and allowing the semaphore to be released at the right moment.

In Fig. 35 I have shown a modified form of semaphore 178 which may be used in place of the semaphores 147, 148 and 149. This semaphore arm 178 is crenulated to provide a plurality of surfaces 179 and 180. The surfaces 179 are preferably painted one color and the surfaces 180 are preferably painted another color. When the semaphore 178 is in a partly extended position only the surfaces 179 will be visible from the front or rear and when it is fully extended only the surfaces 180 will be visible from the front or rear. Thus the signal of intention will appear one color and the fully extended turning signal will appear another color.

Having thus described my invention, I claim:

1. An operating mechanism for a signal device, said operating mechanism including an operating arm, pivotal means to mount said arms on a hand wheel shaft for movement about the shaft, a hand segment, said segment being resiliently secured to said operating arm, said segment including tongues adjacent each end, a yoke, said yoke including a U-shaped portion and oppositely directed fingers, said yoke being secured to said operating arm, an inverted U-shaped member positioned in said U-shaped portion of said yoke and movable therein, said member being secured to said segment, a pair of superimposed disks mounted on said hand wheel shaft and adapted to move about said shaft, each of said disks including a finger having a stop edge thereon, said fingers being oppositely disposed and spaced apart, and means to connect said disks to said hand wheel shaft.

2. For use with a signaling device, an operating mechanism, said operating mechanism comprising an operating arm, pivotal means to mount said arm on a hand wheel shaft for movement about the shaft, a hand segment, said segment being secured to said operating arm, said segment including tongues adjacent each end, a yoke, said yoke being secured to said operating arm, an inverted U-shaped member secured to said segment, said inverted U-shaped member being position in a U-shaped portion of said yoke and movable therein, a member mounted to move with said hand wheel shaft, said member having spaced stop edges thereon, said spaced stop edges affording free limited motion and said edges upon predetermined movement of said hand wheel shaft engaging said yoke to move said segment and said operating arm.

3. In combination with a vehicle including a steering shaft, a signal mechanism including an operating mechanism, a control device, and a semaphore mechanism including a right and a left signal arm and an operating cam, said operating mechanism being mounted on said steering shaft and said control device being mounted adjacent said steering shaft, said operating mechanism including an operating arm, said operating arm being freely movable a predetermined distance relative to said steering shaft and said operating mechanism including means whereby on movement of said shaft beyond a predetermined distance said operating arm will be moved with said shaft, said control device including a control arm, said operating arm being adapted to engage said control arm and move said control arm when it is moved, means connecting said cam and said control arm whereby when said control arm is moved said cam will be actuated to operate said signal arms, said cam being so shaped that upon actuation of said operating arm beyond said predetermined distance it will move the active signal arm to only a partly extended position and when said operating arm is moved by said steering shaft said signal arm will be moved to a fully extended position.

4. The combination of a vehicle including a steering shaft and a signaling mechanism, said signaling mechanism comprising an operating mechanism and a control device means whereby said control device actuates said operating mechanism, said operating mechanism being mounted on said shaft and said control device being mounted adjacent said shaft, said operating mechanism including an operating arm adapted to actuate said control device, means to mount said operating arm for limited free movement on said shaft to actuate said control device independent of movement of said shaft.

5. A signal control mechanism comprising a pair of spaced electric contacts and a second pair of spaced electric contacts, a control arm, said control arm being pivoted intermediate its length, an electrical contact bar secured adjacent one end of said control arm, said contact bar when moved in one direction from its normal position being adapted to bridge said first pair of contacts and when moved in the opposite direction from its normal position being adapted to bridge said second pair of contacts, means adapted to retain said control arm in its two extreme positions and other resilient means adapted to return said control arm to its normal position from any position intermediate its two extreme positions.

6. In combination with a vehicle including a steering shaft, a signaling mechanism, said signaling mechanism including a control device, an operating mechanism for the control device, said operating mechanism comprising an operating arm mounted on said shaft and adapted to move about said shaft, a hand segment, means to resiliently secure said segment to said operating arm, said segment including tongues adjacent each end, a yoke, said yoke including a U-shaped portion and oppositely directed fingers, means to secure said yoke to said operating arm, an inverted U-shaped member being positioned in said U-shaped portion of said yoke and movable therein, means to secure said member to said segment, a disk mounted on said shaft and adapted to move about said shaft, said disk including a finger having a stop edge thereon, and means to connect said disk to said shaft.

7. In combination with a vehicle including a steering shaft, a signaling mechanism, said signaling mechanism including a control device, an operating mechanism for said control device, said operating mechanism including an operating arm mounted on said shaft and adapted to move about said shaft, a hand segment, means to resiliently secure said segment to said operating arm, said segment including tongues adjacent each end, a yoke, said yoke including a U-shaped portion and oppositely directed fingers, means to secure said yoke to said operating arm, an inverted U-shaped member positioned in said U-shaped portion of said yoke and movable therein, means to secure said member to said segment, a pair of superimposed disks mounted on said shaft and adapted to move about said shaft, each of said disks including a finger having a stop edge thereon, said fingers being oppositely disposed and spaced apart and means to connect said disks to said shaft, said means being adjustable whereby the space between said disk fingers may be altered.

8. In combination with a vehicle including a steering shaft, a signaling mechanism, said signaling mechanism including an operating mechanism, a control device, said operating mechanism comprising an operating arm mounted on said shaft and adapted to move about said shaft, a hand segment secured to said operating arm, said segment including tongues adjacent each end, a yoke, said yoke including oppositely directed fingers, said yoke being secured to said operating arm, a pair of superimposed disks mounted on said shaft and adapted to move on said shaft, each of said disks including a finger having a stop edge thereon, said fingers being oppositely disposed and spaced apart, magnetic means adjacent the ends of said disk fingers, said yoke fingers being adapted to ride on the surface of said disk fingers and said segment tongues being adapted to be normally spaced from said magnetic means and said magnetic means being adapted upon contact of said segment tongues with said magnetic means to retain said segment in the position to which it has been moved.

9. A signaling mechanism comprising an operating device, a control mechanism, said operating device including an operating arm, said control device including a control arm, a control disk, a pair of spaced contacts and a second pair of spaced contacts, said control arm being pivoted intermediate its length and having an electrical contact bar adjacent one end thereof, a notch in the opposite end of said control arm, a notch in said control disk of the same depth as said control arm notch and adapted to register with said control arm notch when said control arm is in a neutral position, a plurality of other notches in said disk, said other notches being of less depth than said control arm notch, said operating arm being adapted when in a neutral position to be positioned in said control arm notch and said first notch of said control disk whereby upon movement of said operating arm it will move said control arm to one side or the other to cause said contact bar to bridge either said first or said second pairs of contacts, said operating arm upon continued movement being adapted to pass out of said control arm notch and said first disk notch and upon continued movement to engage one of said other notches whereby upon continued movement said disk will be revolved and carry said operating arm over said control arm without disturbing said control arm, upon continued movement of said operating arm said operating arm being adapted to move out of said other notch, upon movement of said operating arm in a return or opposite direction said arm being adapted to re-engage said other notch and rotate said disk in a reverse direction and pass over said control arm without disturbing said control arm and upon continued movement in said reverse direction to re-engage said first disk notch and said control arm notch and move said control arm to its neutral position.

10. In a signaling device, a pair of spaced contacts, one of said contacts being electrically connected to a source of electrical energy, a second pair of spaced contacts, one of said second pair of contacts being electrically connected to said source of electrical energy, a right pilot lamp socket and a left pilot lamp socket each adapted to support an electric lamp, a center contact associated with each of said sockets, each of said center contacts being resilient and electrically connected to the other contact of its associated pair of previously mentioned contacts, an electrical resistance element connected to each of said pilot lamp sockets of the same ohmic capacity as one of said pilot lamps, an extended finger on each of said resistance elements, each of said center contacts being adapted upon removal of its associated pilot lamp to engage said finger of its associated resistance element and thereby cause the current to flow from said center contact through said resistance element to said socket when electric current is directed thereto.

11. In combination with a vehicle including a hand wheel steering shaft, a signaling mechanism, said signaling mechanism including an operating mechanism, and a control device, said operating mechanism comprising an operating arm mounted on said hand wheel shaft, means to support said operating arm for free limited movement, means fixed on said hand wheel shaft for moving said operating arm when the shaft turns beyond a certain point, a semaphore, said semaphore including a right and a left signal arm, means actuated by said operating arm when said operating arm is actuated and moved within the limit of its free movement about the shaft to selectively move a signal arm to partly extended position and means operated when said operating arm is moved by said steering shaft whereby a signal arm will be fully extended.

12. In combination with a vehicle including a steering shaft, a signaling mechanism, said signaling mechanism including an operating mechanism, a control device, said operating mechanism comprising an operating arm mounted on said shaft and adapted to move about said shaft, a hand segment, means to resiliently secure said segment to said operating arm, said segment including tongues adjacent each end, a yoke, said yoke being secured to said operating arm, an inverted U-shaped member secured to said segment, said inverted U-shaped member being positioned in said U-shaped portion of said yoke and movable therein, a pair of superimposed disks means whereby said disks move about said shaft, each of said disks including a finger having a stop edge thereon, said fingers being oppositely disposed and spaced apart, to afford free limited motion and said edges upon predetermined movement of said shaft engaging said yoke to move said segment and said operating arm.

13. In a signal control device, a pivoted control disk, a right indicator contact and a left indicator contact, a circuit including said contacts, said control arm being pivoted intermediate its length and having means thereon to close said circuit selectively through said contacts, the axis of said control disk coinciding with the axis of said control arm, the control arm having a notch therein, said control disk having a notch therein of the same depth as said control arm notch and adapted to register with said control arm notch when said control arm is in a neutral position, said disk having a plurality of other notches therein, said other notches being of less depth than said control arm notch, and a movable operating means, means to mount said operating means for movement into a neutral position in said control arm notch and said first notch of said control disk, whereby movement of said operating means moves both the control arm and the control disk, and releasable means to hold said disk in set position.

CARL MOHR.